BEST AVAILABLE COPY

UNITED STATES PATENT OFFICE.

9,184 X

JARIUS S. TEFFT, OF AMHERST, NEW YORK.

IMPROVEMENT IN PLOWS.

Specification forming part of Letters Patent dated October 17, 1835.

*To all whom it may concern:*

Be it known that I, JARIUS S. TEFFT, of Amherst, in the county of Erie and State of New York, have invented a new and useful Improvement in Plows, which has not heretofore been used or known; and I do hereby declare that the following is a full and exact description of the construction and operation of the said machine as invented or improved by me.

All the parts are cast separately and attached to one single piece, which I call the "standard," forming an upright tongue or bar intended to pass through the beam and be there secured by a wedge or key, and to be the principal stay of the plow. It is to descend with an inclination forward to form the slope of the cutting-edge (or what serves as the colter) and with a flat face on the land side, so as to fasten the plate intended for that side. Along the cutting-edge part a broad wing is to be cast on it, falling backward at an inclination from said part, so as to suit the bevel or concavity of the mold-board, and will be sufficiently broad and extensive to give a secure position thereon to the said board, for which reason I give it a semicircular sweep along the outer edge and form in it a hole for the reception of a bolt by which to secure said mold-board to it. The same is done on the opposite side in order to secure the landside-plate, and also near the point or lower extremity for the share, which is placed below the mold-board and landside-plate, as usual; or it may be placed above by shortening the mold-board and allowing it to join close to the cutting-edge.

The landside-plate is to be formed in one piece, descending low enough to form the bar on its whole length, and also far enough forward to terminate at the point of the share on which it bears. It will likewise form the cutting-edge by lapping over it and the mold-board, which is thereby additionally secured.

As I have said, the mold-board and landside-plate are both secured to the standard by means of bolts and nuts, but the share is held on by means of a hole through it in near about the usual place, extending to receive a staple or ring, which is cast into the standard there for that purpose, and through this staple or ring, and on the under side of the share, is driven a wedge with the larger part forward, which is to secure the share, (whether placed below or above the mold-board,) and at the same time is driven tighter as the plow advances, instead of the risk of being loosened, as in the case of a screw and nut. Thus all the different parts of my plow are separately attached to the standard, and consequently can be renewed as they wear out with ease and expedition, reserving the said standard as free from wear and ready to answer for many of said renewals, which will be found a great saving of expense as well as trouble.

I am aware that parts of this arrangement may have been used before as forming elements of construction, but not the manner of forming a separate standard as I have described, to which the other parts are attached severally. Therefore

What I claim as new, and for which I ask Letters Patent, is—

1. The manner of constructing and using the standard mentioned above.

2. The manner of constructing and applying the landside-plate, and also the general construction and combination of the several parts above described, by which general combination it derives that character by which it will be distinguished by any competent machinist from any other plow now in use.

In testimony that the above is a full and exact description of the construction and use of my plow as invented or improved by me I have hereunto affixed my hand this 17th day of September, in the year 1835.

JARIUS S. TEFFT.

Witnesses:
C. H. W. WHARTON,
HARRY STONE.